(12) United States Patent
Caputo

(10) Patent No.: US 8,910,221 B2
(45) Date of Patent: Dec. 9, 2014

(54) TECHNIQUE FOR PROVIDING PROGRAMMING CONTENT THROUGH A COMMUNICATIONS NETWORK HAVING LIMITED BANDWIDTH

(75) Inventor: Nicholas D. Caputo, Hastings, NY (US)

(73) Assignee: Time Warner Cable Enterprises LLC, New York, NY (US)

( * ) Notice: Subject to any disclaimer, the term of this patent is extended or adjusted under 35 U.S.C. 154(b) by 1103 days.

(21) Appl. No.: 10/429,998

(22) Filed: May 5, 2003

(65) Prior Publication Data

US 2003/0217365 A1    Nov. 20, 2003

(51) Int. Cl.
| | |
|---|---|
| *H04N 7/16* | (2011.01) |
| *H04N 7/173* | (2011.01) |
| *H04N 7/12* | (2006.01) |
| *H04N 11/02* | (2006.01) |
| *H04N 11/04* | (2006.01) |
| *H04N 7/10* | (2006.01) |
| *H04N 21/438* | (2011.01) |
| *H04N 21/222* | (2011.01) |
| *H04N 21/2385* | (2011.01) |
| *H04N 21/24* | (2011.01) |
| *H04N 21/426* | (2011.01) |
| *H04N 21/658* | (2011.01) |

(52) U.S. Cl.
CPC ........... *H04N 21/2385* (2013.01); *H04N 7/106* (2013.01); *H04N 7/17318* (2013.01); *H04N 21/4383* (2013.01); *H04N 21/2221* (2013.01); *H04N 21/2408* (2013.01); *H04N 21/42684* (2013.01); *H04N 21/6581* (2013.01)
USPC ............... 725/95; 725/27; 725/93; 725/98; 725/103; 725/118; 375/240.01

(58) Field of Classification Search
USPC .................................................. 725/126, 95
See application file for complete search history.

(56) References Cited

U.S. PATENT DOCUMENTS

| | | | | |
|---|---|---|---|---|
| 4,750,213 | A | * | 6/1988 | Novak .......................... 455/3.01 |
| 5,606,359 | A | | 2/1997 | Youden et al. |
| 5,642,151 | A | * | 6/1997 | Nusbickel et al. .............. 725/78 |
| 5,708,961 | A | | 1/1998 | Hylton et al. |
| 5,818,438 | A | | 10/1998 | Howe et al. |
| 5,872,588 | A | | 2/1999 | Aras et al. |
| 6,072,982 | A | | 6/2000 | Haddad |
| 6,198,478 | B1 | * | 3/2001 | Ota et al. ....................... 715/716 |
| 6,510,556 | B1 | | 1/2003 | Kusaba et al. |

(Continued)

FOREIGN PATENT DOCUMENTS

| | | |
|---|---|---|
| EP | 1030305 A3 | 9/2002 |
| EP | 0903941 B1 | 3/2004 |
| WO | 9929108 A1 | 6/1999 |

*Primary Examiner* — Mushfikh Alam
(74) *Attorney, Agent, or Firm* — Gazdzinski & Associates, PC

(57) ABSTRACT

In a cable television system, a specific carrier is assigned to deliver programming content of a program channel to a service area for a period, defined as a function of viewership of the program channel during that period. For example, the program channel is assigned the specific carrier during the time when it has a generally strong viewership. Otherwise, the program channel is assigned a carrier on an as needed basis, i.e., only when one or more subscribers in the service area request such a program channel. Viewing statistics are generated to identify viewership patterns or viewing habits of the subscribers in the service area with respect to a given program channel. In another embodiment, based on the viewing statistics, popular and unpopular programs, program elements, program lineups, program channels are identified on a temporal and/or regional basis.

18 Claims, 7 Drawing Sheets

(56) References Cited

U.S. PATENT DOCUMENTS

| | | | |
|---|---|---|---|
| 6,543,053 B1 * | 4/2003 | Li et al. | 725/88 |
| 6,583,825 B1 * | 6/2003 | Yuen et al. | 348/731 |
| 6,718,552 B1 * | 4/2004 | Goode | 725/95 |
| 6,754,271 B1 * | 6/2004 | Gordon et al. | 375/240.12 |
| 6,886,029 B1 * | 4/2005 | Pecus et al. | 709/203 |
| 6,889,382 B1 | 5/2005 | Anderson | |
| 7,003,790 B1 | 2/2006 | Inoue et al. | |
| 7,020,893 B2 * | 3/2006 | Connelly | 725/97 |
| 7,069,577 B2 * | 6/2006 | Geile et al. | 725/106 |
| 7,228,555 B2 * | 6/2007 | Schlack | 725/35 |
| 7,272,227 B1 * | 9/2007 | Beran | 380/241 |
| 7,383,564 B2 * | 6/2008 | White et al. | 725/89 |
| 7,971,222 B2 * | 6/2011 | Ellis | 725/91 |
| 7,983,272 B2 * | 7/2011 | Carlson et al. | 370/395.4 |
| 2002/0002708 A1 * | 1/2002 | Arye | 725/95 |
| 2002/0056098 A1 * | 5/2002 | White | 725/39 |
| 2002/0059626 A1 | 5/2002 | Lemmons | |
| 2002/0138831 A1 * | 9/2002 | Wachtfogel et al. | 725/32 |
| 2002/0166121 A1 | 11/2002 | Rovira | |
| 2003/0037331 A1 * | 2/2003 | Lee | 725/32 |
| 2003/0121047 A1 * | 6/2003 | Watson et al. | 725/93 |
| 2003/0156218 A1 * | 8/2003 | Laksono | 348/388.1 |
| 2003/0163817 A1 * | 8/2003 | Han | 725/46 |
| 2004/0123324 A1 * | 6/2004 | Sazzad et al. | 725/89 |
| 2005/0071882 A1 * | 3/2005 | Rodriguez et al. | 725/95 |
| 2007/0083902 A1 * | 4/2007 | Urdang et al. | 725/95 |
| 2009/0187934 A1 * | 7/2009 | Norman | 725/14 |

* cited by examiner

300

| | 304 | 306 | 308 |
|---|---|---|---|
| | X | $N_{PCHX}$ | ASSIGNED CARRIER |
| 313 | 1 | 0 | NULL |
| 311 | 2 | 12 | $C_3$ |
| | 3 | 1 | $C_{11}$ |
| | ⋮ | ⋮ | ⋮ |
| | K | 5 | $C_{25}$ |

900

| TIME | X | SGID | $N_{PCHX}$ |
|---|---|---|---|
| YEAR/01/12 00:26:32:015 | 51 | 1107 | 1 |
| YEAR/01/12 00:26:40:125 | 51 | 1107 | 0 |
| YEAR/01/12 00:26:40:125 | 54 | 1109 | 59 |
| YEAR/01/12 00:27:49:031 | 50 | 1109 | 10 |
| YEAR/01/12 00:59:52:187 | 54 | 1109 | 60 |
| YEAR/01/12 00:59:52:218 | 53 | 1109 | 3 |
| YEAR/01/12 00:59:55:671 | 52 | 1109 | 0 |
| YEAR/01/12 00:59:56:984 | 51 | 1109 | 1 |
| YEAR/01/12 01:00:02:421 | 50 | 1107 | 13 |

|  | PROGRAM CH. | 1003 | 1005 | 1007 | 1009 | 1011 |
|---|---|---|---|---|---|---|
| TIME |  | 50 | 51 | 52 | 53 | 54 |
| 6:00 |  | 17 | 0 | 0 | 2 | 63 | ← 1021
| 6:10 |  | 23 | 2 | 0 | 3 | 50 | ← 1023
| 6:20 |  | 13 | 1 | 1 | 0 | 51 |
| 6:30 |  | 16 | 0 | 0 | 3 | 66 |
| 6:40 |  | 15 | 0 | 0 | 1 | 62 |
| 6:50 |  | 22 | 0 | 0 | 4 | 50 |
| 7:00 |  | 12 | 0 | 1 | 2 | 55 |
| 7:10 |  | 12 | 3 | 0 | 2 | 45 |

⋮

| 12:30 | 19 | 2 | 1 | 0 | 40 |
|---|---|---|---|---|---|
| 12:40 | 22 | 3 | 1 | 0 | 34 |
| 12:50 | 23 | 1 | 0 | 1 | 2 |
| 13:00 | 20 | 0 | 2 | 2 | 0 |
| 13:10 | 25 | 1 | 0 | 1 | 5 |
| 13:20 | 19 | 2 | 1 | 3 | 20 |
| 13:30 | 17 | 1 | 0 | 2 | 25 |

} 1033 (rows 12:50–13:10)

⋮

| 18:30 | 14 | 8 | 0 | 0 | 45 |
|---|---|---|---|---|---|
| 18:40 | 5 | 12 | 2 | 1 | 54 |
| 18:50 | 1 | 20 | 1 | 0 | 55 |
| 19:00 | 0 | 35 | 0 | 0 | 62 |
| 19:10 | 0 | 40 | 0 | 0 | 45 |
| 19:20 | 0 | 45 | 0 | 1 | 34 |
| 19:30 | 0 | 50 | 1 | 0 | 22 |

⋮

TECHNIQUE FOR PROVIDING PROGRAMMING CONTENT THROUGH A COMMUNICATIONS NETWORK HAVING LIMITED BANDWIDTH

FIELD OF THE INVENTION

The invention relates to a communications system and method, and more particularly to a community access television (CATV) system and method for providing program material through a cable network having limited bandwidth.

BACKGROUND OF THE INVENTION

Cable television is typically provided by delivering television programming through a community access television (CATV) system to subscribers. Specifically, in delivering the television programming, a headend in the CATV system distributes program data streams containing program materials through different channels of a distribution network, which occupy specified frequency bands. The program data stream for each channel is used to modulate a carrier associated with the channel. The resulting modulated carriers are combined and transmitted through the distribution network to a service area node, where the combined modulated carries are provided to a service area. A subscriber in the service area utilizes a set-top terminal to receive the combined modulated carriers and tune to a desired channel to obtain the program material from the associated modulated carrier.

In prior art, the combined modulated carriers provided to a service area contain program materials of all channels used in a CATV system. However, as a cable TV provider uses an increasing number of channels to deliver additional program materials to attain a larger subscription, the number of available channels will soon run out. Thus, an urgent need arises where an efficient utilization of the limited bandwidth of the distribution network is required to deliver the additional program materials.

SUMMARY OF THE INVENTION

A copending, commonly assigned U.S. application Ser. No. 09/956,688 ("the '688 application") filed on Sep. 20, 2001 discloses a switched broadcast technique for redressing some of the prior art deficiencies. According to such a technique, selected program channels are made available to subscribers in the same service area on an as needed basis. As a result, the number of program channels furnished, although not simultaneously, by a system using the switched broadcast technique may exceed the maximum number of carriers allowed.

The present invention improves the switched broadcast technique by identifying "popular" program channels, which command generally strong viewership in a service area. In accordance with the invention, a popular program channel may be assigned a carrier on a long term basis, not subject to reassignment according to the switched broadcast technique as soon as no set-top terminals in the same service area are tuned to such a program channel. The invention, in part, is based upon a recognition that even though a program channel is popular, there may be brief moments in which all set-top terminals in the same service area are tuned away from such a program channel. Thus, the invention improves the switched broadcast technique by assigning a carrier to a popular program channel for a period despite intermittent viewership, thereby advantageously saving the system resources otherwise needed to frequently assigning and reassigning a carrier therefor during such a period.

In an illustrative embodiment, the popularity of a program channel is determined based on viewing statistics, which are generated based on data in requests issued from the set-top terminals in a service area. The requests may be issued in response to the subscribers at the set-top terminals selecting and deselecting the program channel. Based on the viewing statistics, at least one period in which the program channel is in a particular status (e.g., being popular) is identified. For example, a program channel is considered popular when the number of set-top terminals receiving programming content associated with the program channel exceeds a threshold. A selected carrier is assigned to deliver the programming content associated with the program channel for the identified period.

The invention is also based upon a recognition that popularity of a program channel may change by day or even time of day. Thus, in accordance with an aspect of the invention, a popular program channel may be assigned a particular carrier until the program channel becomes "unpopular." At such time, the particular carrier may be assigned to another popular program channel, and the unpopular program channel is then subject to switched broadcast. Further, a carrier may be shared by complementary program channels, where one program channel is popular for times when the other program channel is unpopular, and vice versa.

Thus, in a second embodiment of the invention, viewing statistics are generated based on data in requests concerning at least first and second program channels, which are issued from the set-top terminals in a service area. Based on the statistics, a first period and a second period in which the first program channel and the second program channel are in a certain status are determined, respectively. The first and second periods are non-overlapping. A carrier is allocated to deliver program material associated with the first program channel to the service area for the first period. The same carrier is re-allocated to deliver program material associated with the second program channel to the service area for the second period. The carrier may be repeatedly allocated and re-allocated in a similar manner.

In addition, the viewing statistics may be used to identify popular or unpopular program elements including, e.g., TV shows; commercials; skits, monologues and chapters made part of TV shows; etc. The program elements associated with a program channel are provided in a sequence to a service area according to a predetermined schedule. Based on the viewing statistics, a period in which the program channel is in a particular status (being popular or unpopular) is determined. A subset of the popular or unpopular program elements provided in the period is identified based on the predetermined schedule. Further, by aggregating the viewing statistics concerning multiple service areas which comprise a region, e.g., the South, Midwest, Northeast, West Coast, etc., regional acceptance of a program element may be determined.

In a third aspect, an apparatus configured to controllably deliver programming content associated with a program source in response to requests from a plurality of terminals in a service area is disclosed. In one embodiment, the apparatus comprises: an interface configured to receive the requests; a memory configured to store a first set of statistics generated based on data obtained from requests received during a first time interval; and a second set of statistics based on data obtained from requests received during a second time interval, the second time interval corresponding to a typical advertisement length, and a processing element. The processing element is configured to: identify, based on the first set of statistics, a plurality of future time periods in which the program source will attain a first popularity, a selected carrier assigned to deliver the programming content associated with the program source to the service area during the identified future periods, the carrier not reassigned when there is a lack of user requests for the programming content existing during the identified future periods, and during periods other than the identified future periods, the programming content associated with the program source delivered to the service area according to switched digital broadcast mechanisms; and identify, based on the second set of statistics, a second popularity of a particular advertisement based on a plurality of service group identifiers in the stored data. In a further embodiment the selected carrier is assigned to deliver the programming content based at least in part on the first set of statistics and the first and the second popularity are based at least in part on a determination that a number of terminals that receive the programming content in the identified future time periods exceeds a threshold.

In a fourth aspect, a method for controllably delivering programming content associated with a program source in response to requests from a plurality of terminals in a service area is disclosed. In one embodiment, the method comprises: storing a first set of statistics based on data obtained from requests received during a first time interval; storing a second set of statistics based on data obtained from requests received during a second time interval, the second time interval corresponding to a typical advertisement length; identifying, based at least in part on the first set of statistics, a plurality of future time periods in which the program source will attain a first popularity by determining that a number of terminals that receive the programming content in the identified future time periods exceeds a threshold; assigning a selected carrier to deliver the programming content associated with the program source to the service area during the identified future periods based at least in part on the first set of statistics, the carrier not being reassigned when there is a lack of user requests for the programming content existing during the identified future periods; during periods other than the identified future periods, causing the programming content associated with the program source to be delivered to the service area according to switched digital broadcast mechanisms; and identifying, based at least in part on the second set of statistics, a second popularity of a particular advertisement based on a plurality of service group identifiers in the stored data.

In a fifth aspect, a non-transitory computer readable apparatus is disclosed. In one embodiment, the non-transitory computer readable apparatus comprises a plurality of instructions which are configured to, when executed by a processor controllably deliver programming content associated with a program source in response to requests from a plurality of terminals in a service area. This is accomplished via: generation of a first set of statistics based on data obtained from requests received during a first time interval; generation of a second set of statistics based on data obtained from requests received during a second time interval, the second time interval corresponding to a typical advertisement length; identification, based at least in part on the first set of statistics, of a plurality of future time periods in which the program source will attain a first popularity, the identification being accomplished via a determination that a number of terminals that receive the programming content in the identified future time periods exceeds a threshold; assignment of a selected carrier to deliver the programming content associated with the program source to the service area during the identified future periods based at least in part on the first set of statistics, the carrier not being reassigned when there is a lack of user requests for the programming content existing during the identified future periods; and identification, based at least in part on the second set of statistics, of a second popularity of a particular advertisement based on a plurality of service group identifiers in the stored data. In a further embodiment, during periods other than the identified future periods, the programming content associated with the program source is delivered to the service area according to switched digital broadcast mechanisms.

BRIEF DESCRIPTION OF THE DRAWING

Further objects, features and advantages of the invention will become apparent from the following detailed description taken in conjunction with the accompanying drawing, in which:

FIG. 10 tabulates viewing statistics generated by the data analyzer/controller based on the collected data.

DETAILED DESCRIPTION

The invention is an improvement on a switched broadcast technique disclosed, e.g., in copending, commonly assigned U.S. application Ser. No. 09/956,688 ("the '688 application") filed on Sep. 20, 2001, which is incorporated herein by reference. In accordance with the switched broadcast technique, a communications system, e.g., a CATV system, makes available to subscribers in the same service area selected program channels on an as needed basis. In order to fully appreciate the invention, one needs to learn about the switched broadcast technique, an implementation of which will now be described.

Switched Broadcast Technique

Figure 1:
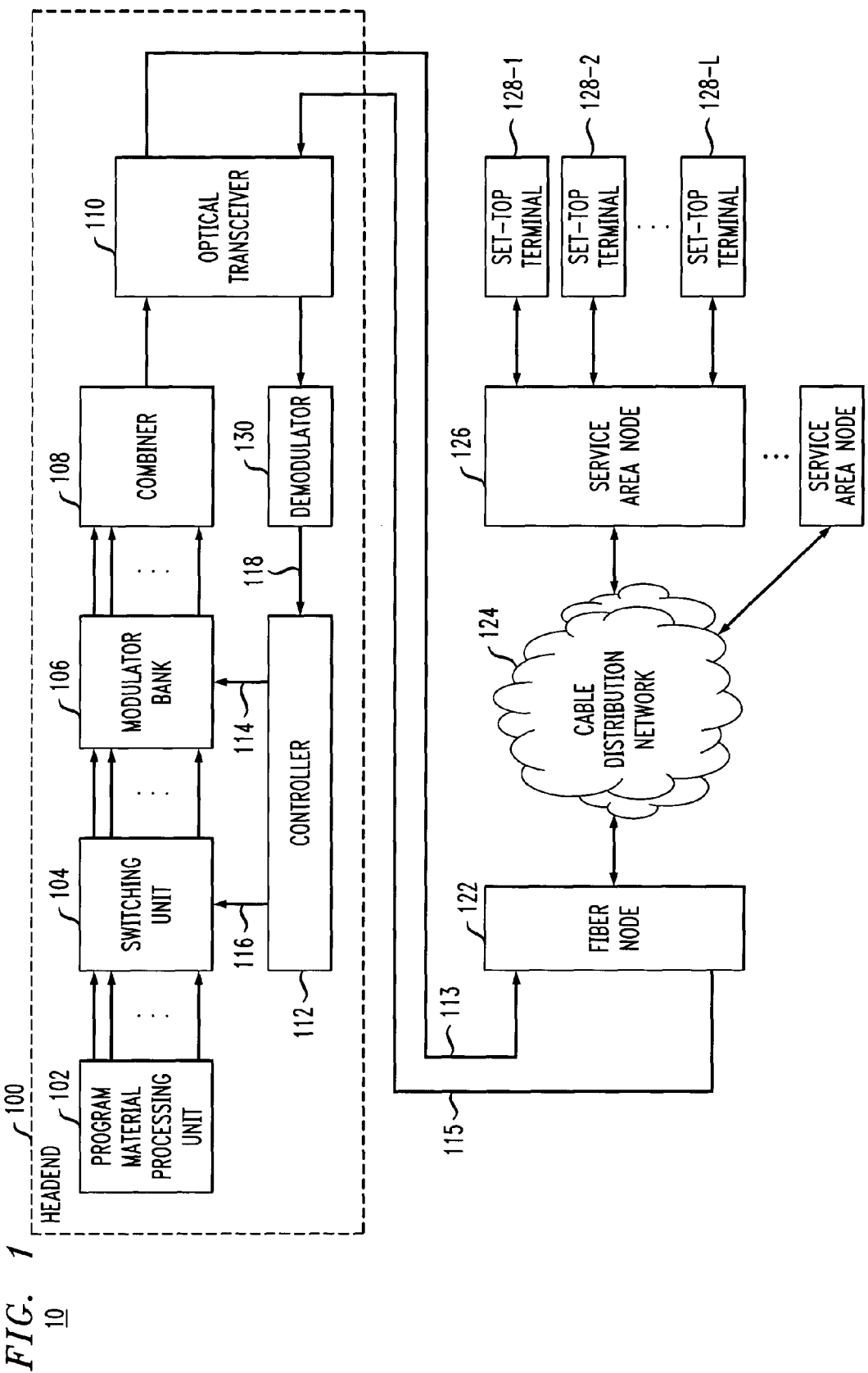
FIG. 1 is a block diagram of a hybrid fiber coax cable CATV system in accordance with a switched broadcast technique.

FIG. 1 illustrates hybrid fiber coax (HFC) cable CATV system 10 incorporating the switched broadcast technique for providing program materials to set-top terminals on the subscriber premises. As shown in FIG. 1, system 10 includes headend 100, fiber node 122, cable distribution network 124, and service area nodes, e.g., node 126 which is connected to set-top terminals 128-1 through 128-L in a service area, where L is a predetermined number.

In headend 100, program material processing unit 102 receives program materials from various sources via satellites, terrestrial microwave transmissions, cable, etc. The program materials are processed by unit 102 to form K individual program data streams in a digital format, where K is an integer. Each program data stream contains program material, which requires a transmission channel having a specified frequency band for its distribution. It should be noted that the term "transmission channel" used here should; not be confused with a "program channel." A "transmission channel" signifies a designated frequency band through which a program data stream containing program: material is transmitted. On the other hand, a "program channel" signifies the source of the program material selected by a subscriber to view. For example, a subscriber may select program channel 2 to view program material provided by CBS, program channel 14 to view program material provided by ESPN; program channel 32 to view program material provided by MTV, etc. In this instance, there are K program channels corresponding to the K program data streams.

Under control of controller 112, switching unit 104 selects and switches a subset of the K program data streams, say, p program data streams to modulator bank 106, where p≤K. The program data streams in the subset are selected in a manner described below. Each selected program data stream is transmitted through a different transmission channel after it modulates a carrier associated with the transmission channel in a designated forward passband. As is well known, in the United States the designated forward passband for cable TV ranges from 50 MHz to 550 MHz. However, it will be appreciated that a person skilled in the art may utilize other forward passbands, instead.

Figure 2:
FIG. 2 illustrates selected carriers for transmitting program materials and control messages in a forward passband of the system of FIG. 1.

FIG. 2 illustrates M carriers, $C_1$ through $C_M$, associated with M transmission channels in the forward passband, respectively, which are pre-selected for use in this instance. Since the forward passband is limited in bandwidth, M in this instance represents the maximum number of carriers or transmission channels that the forward passband can accommodate. As shown in FIG. 2, the carrier frequency of $C_1$ is denoted $CF_1$; the carrier frequency of $C_2$ is denoted $CF_2$; ...; and the carrier frequency of $C_M$ is denoted $CF_M$. In addition, a control carrier CC having a carrier frequency CCF is assigned to carry control messages by controller 112 to the set-top terminals through a control channel in the forward passband.

In accordance with the switched broadcast technique, carriers are dynamically assigned to carry program materials of only those program channels selected by the set-top terminals (or subscribers) in a service area. The number of program channels that the CATV system can provide, although not simultaneously, can exceed M. That is, K can be greater than M in this instance.

Controller 112 communicates to switching unit 104 through link 116, causing unit 104 to switch, to modulator bank 106, the selected p program data streams which contain the program channel materials selected aggregately by the subscribers in the service area. As long as p≤M, controller 112 manages to assign p carriers to carry the respective data streams. To that end, controller 112 also specifies to unit 104 the selected inputs of modulator bank 106 to which the p data streams are switched.

In this instance, modulator bank 106 includes conventional modulators. Each input to modulator bank 106 is fed to a different modulator for modulating the input onto one of the M carriers. The p data streams are switched by unit 104 to the appropriate inputs of modulator bank 106 to be modulated onto the p assigned carriers, resulting in p data signals representing the modulated carriers, respectively. In addition, controller 112 transmits control messages described below, through link 114, to modulator bank 106 where a modulator modulates the control messages onto the aforementioned control carrier, resulting in a control signal representing the modulated control carrier.

Combiner 108 combines the p data signals and control signal to form a combined signal, which is fed to optical transceiver 110. The latter generates an optical signal representing the combined signal. The optical signal traverses optical fiber 113 to fiber node 122. A transceiver (not shown) in fiber node 122 which performs the inverse function to transceiver 110 converts the optical signal back to the combined signal in electrical form. The combined signal traverses cable distribution network 124 to, say, service area node 126, where the combined signal is multicast to set-top terminals 128-1 through 128-L. A set-top terminal may be tuned to the control carrier frequency CCF and extract the control signal from the received combined signal. The control signal may contain information identifying the carrier which is assigned to carry the program channel material selected by the set-top terminal. Based on any such information, the set-top terminal is tuned to the frequency of the identified carrier and extracts the corresponding data signal from the received combined signal. The selected program channel material is then derived in a well known manner from the extracted data signal for viewing.

Figure 3:
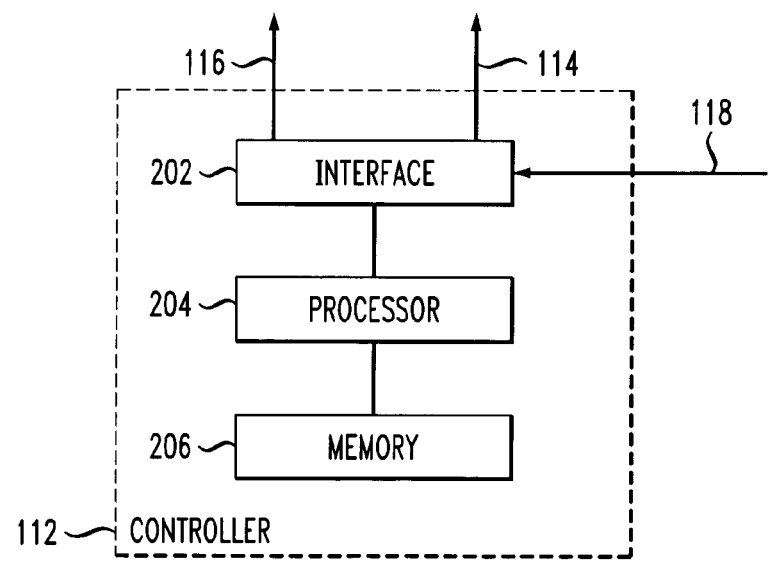
FIG. 3 is a block diagram of a controller used in the system of FIG. 1.

Referring to FIG. 3, controller 112 includes processor 204 of conventional design, which is connected to memory 206 and interface 202. Processor 204 receives, e.g., from one or more of set-top terminals 128-1 through 128-L, requests for materials of program channels selected thereby. Such requests are processed by processor 204 in accordance with routines stored in memory 206 which are described below. It suffices to know for now that in response to one such request, processor 204 causes switching unit 104 to switch the program data stream corresponding to the requested program channel to a selected input of modulator bank 106 and assigns an unused carrier for transmitting the data stream if processor 204 has not done so. In addition, processor 204 transmits a control message receivable by the requesting set-top terminal, which includes the information identifying the carrier assigned by processor 204 to carry the requested program channel material. As mentioned before, based on such information, the requesting set-top terminal is tuned to the frequency of the identified carrier to obtain the selected program channel material.

Figures 4, 5:
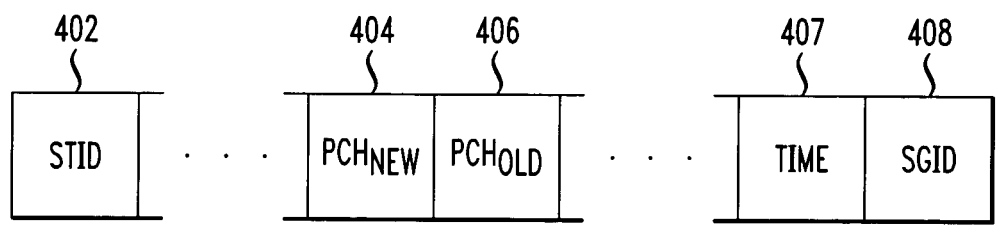
FIG. 4 is a table used by the controller for dynamically assigning the carriers for transmission of program materials in accordance with the switched broadcast technique.
FIG. 5 illustrates a data format of a request processed by the controller.

To manage the dynamic assignment of carriers for transmitting requested program channel materials to each service area, an assignment table is used in this instance which is stored in memory 206. FIG. 4 illustrates such an assignment table (denoted 300), which includes columns 304, 306 and 308. Column 304 enumerates each program channel X selectable by a subscriber through a set-top terminal, which ranges from 1 to K in this instance. Column 306 tracks, for each program channel X, the number of subscribers in the service area selected that program channel to watch ($N_{PCHX}$). Column 308 includes entries identifying the carriers assigned by processor 204 to carry the respective materials of program channels X. Thus, with assignment table 300, processor 204 has knowledge that, for example, referring to row 311, carrier $C_3$ (one of the carriers $C_1$ through $C_M$) is assigned for program channel 2 (X=2) which 12 subscribers ($N_{PCHX}$=12) have selected to watch. In addition, as indicated in row 313, no subscriber ($N_{PCHX}$=0) has selected to watch program channel 1 (X=1). As such, no carrier (Null) is assigned for program channel 1. That is, program channel 1 material is currently not transmitted to service area node 126 and thus not currently made available in the service area.

When a subscriber at a set-top terminal selects a different program channel to watch, a request for material of the newly-selected program channel is sent from the set-top terminal to controller 112. It should be noted at this point that each of set-top terminals 128-1 through 128-L is pre-assigned with an identifier for identifying the set-top terminal. FIG. 5 illustrates the request which includes, among others, STID field 402 containing an identifier identifying the requesting set-top terminal, $PCH_{NEW}$ field 404 containing the newly-selected program channel number, $PCH_{OLD}$ field 406 containing the previously-selected program channel number, TIME field 407 containing a time stamp of the request, and service group identification (SGID) field 408 containing an identifier identifying the service group to which the set-top terminal belongs. In this instance, terminals 128-1 through 128-L are in the same service area having the same SGID value, which are served by common modulator facility.

Thus, for example, if the subscriber changes the program channel selection from channel 8 to channel 2 (or in other words "deselects" channel 8 in favor of channel 2), the value of $PCH_{NEW}$ field 404 would be set to "8" and that of $PCH_{OLD}$ field 406 would be set to "2." If the subscriber has just turned on the cable TV to watch program channel 9, the value of $PCH_{NEW}$ field 404 in that instance would be set to "9" and that of $PCH_{OLD}$ field 406 would be set to "0," indicating an off state. Conversely, if the subscriber who has been watching program channel 9 chooses to turn off the cable TV, the value of $PCH_{NEW}$ field 404 would be set to "0" and that of $PCH_{OLD}$ field 406 would be set to "9."

Referring back to FIG. 1, the above-described request is generated by the requesting set-top terminal, say, terminal 128-1, which incorporates a cable modem for modulating a specified carrier in a reverse passband with the request data. As is well known, in the United States the reverse passband, which ranges from 5 MHz to 42 MHz, is allocated for transmission of signals from set-top terminals to a headend to realize interactive services, e.g., the present cable TV service. However, it will be appreciated that a person skilled in the art may utilize other reverse passbands, instead. The modulated signal from terminal 128-1 representing the request data is fed to service area node 126, from where it is forwarded to fiber node 122 through cable distribution network 124. In fiber node 122, the aforementioned optical transceiver (not shown) generates an optical signal representing the modulated signal. The optical signal traverses optical fiber 115 to optical transceiver 110 in headend 100. Optical transceiver 110 converts the optical signal back to the modulated signal in electrical form. The modulated signal is then demodulated by demodulator 130 to recover the original request, which is fed to controller 112 through link 118. In response to the received request, controller 112 invokes a first routine stored in memory 206.

Figure 6:
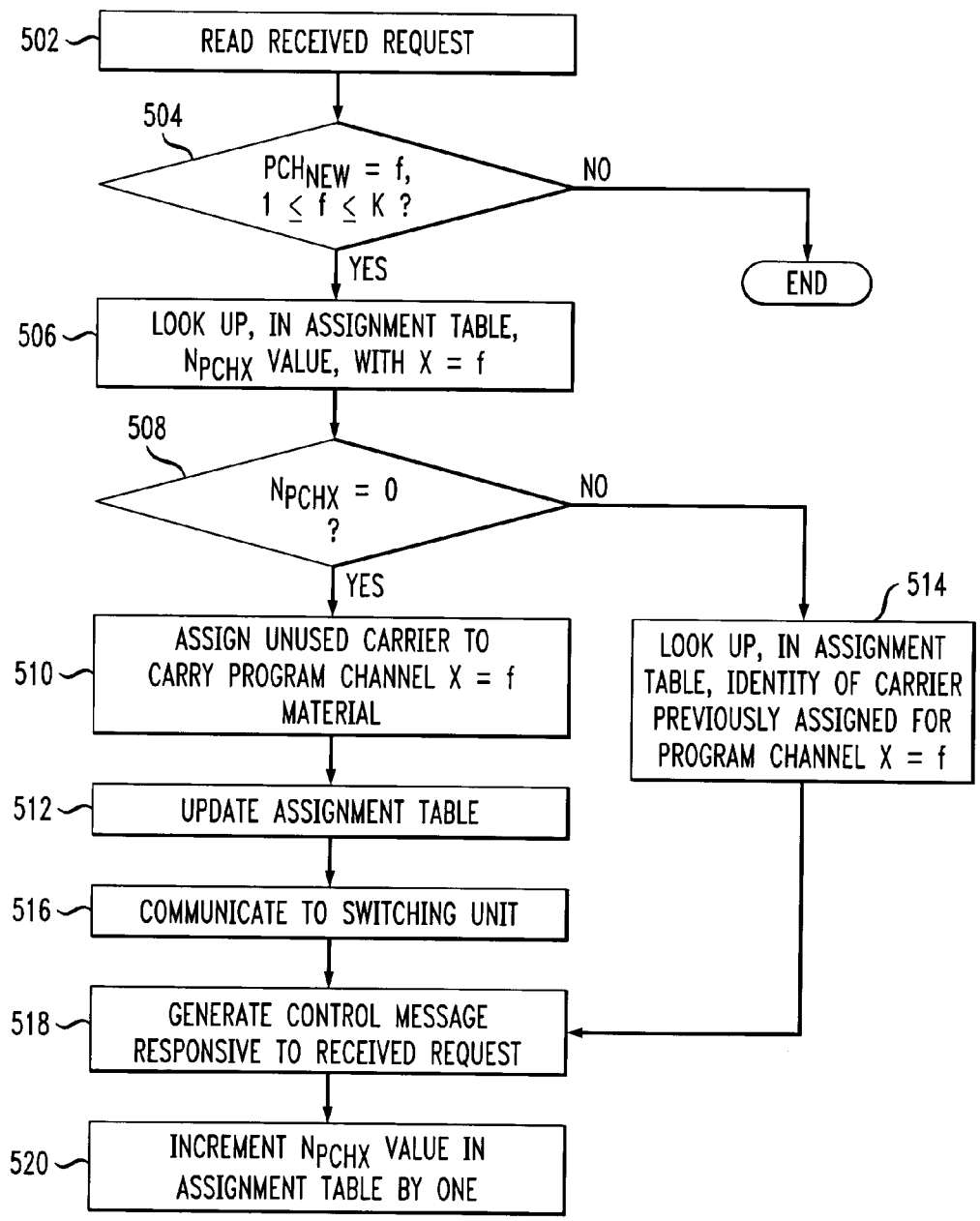
FIG. 6 is a flow chart illustrating a process for processing the request.
Figure 7:
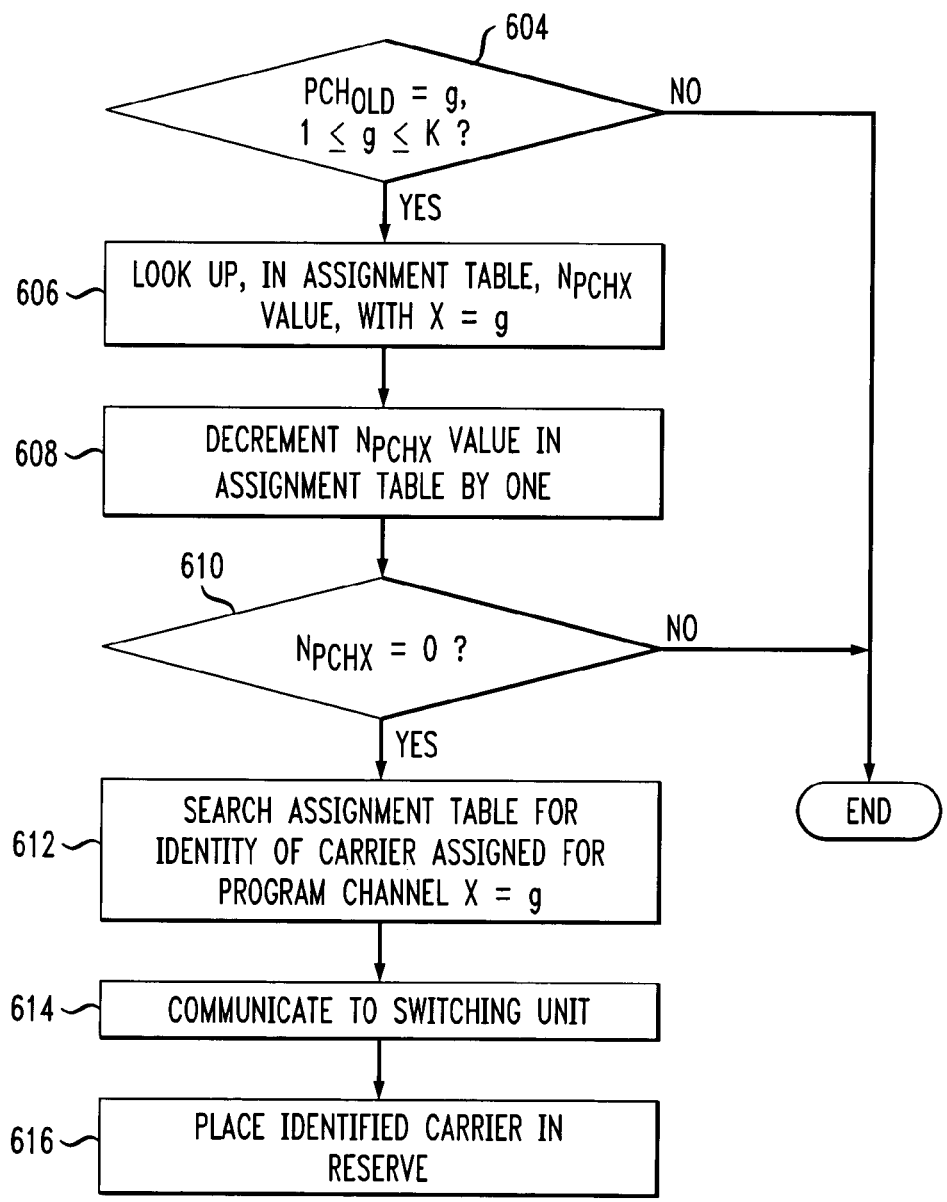
FIG. 7 is a flow chart illustrating a process for retiring an unused carrier.

Instructed by the first routine, processor 204 reads the received request, as indicated at step 502 in FIG. 6. At step 504, processor 204 determines whether $PCH_{NEW}$ field 404 in the request has a nonzero value f, 1≤f≤K. If not, i.e., the $PCH_{NEW}$ field value equal to "0" indicating that the subscriber's cable TV has been turned off, the routine comes to an end. Otherwise, processor 204 at step 506 looks up, in assignment table 300, the value of $N_{PCHX}$ with X=f in this case. At step 508, processor 204 determines whether the $N_{PCHX}$ value just looked up equals 0. If $N_{PCHX}$=0, analogous to the previously described situation with respect to row 313 of table 300, no carrier has been assigned to carry the requested program channel material to service area node 126. That is, the requested program material is currently not made available to the service area. In that case, processor 204 at step 510 assigns an unused carrier to carry the requested material of program channel X=f. The new carrier may be selected to avoid as much as possible noise and interference with other carriers being used to optimize the cable TV quality. At step 512, processor 204 updates assignment table 300 to include the identity of the carrier assigned for program channel X=f. Processor 204 at step 516 communicates to switching unit 104, directing it to switch the program data stream associated with program channel X=f to the proper input of modulator bank 106 such that the program channel material is modulated onto the newly-assigned carrier directed to the service area identified by the SGID from the request. At step 518, processor 204 generates a control message responsive to the received request, which is to be read by the requesting set-top terminal, terminal 128-1 in this instance. The control message includes, among other information, the STID from the request identifying terminal 128-1 which is the intended recipient of the message, and the identity of the assigned carrier carrying the requested program channel material. The control message is transmitted through the control channel in a manner described before and multicast from service area node 126 to the set-top terminals in the service area. In particular, terminal 128-1 is tuned to the control channel and reads the STID information in the control message, which identifies terminal 128-1 in this instance. Recognizing that it is the intended recipient of the message, terminal 128-1 goes on to read other information in the message including the identity of the assigned carrier carrying its selected program channel material. With the knowledge of the assigned carrier's identity, terminal 128-1 is tuned to the frequency of the assigned carrier to receive the selected program channel material.

In any event, the routine proceeds from step 518 to step 520 where processor 204 increments the value of $N_{PCHX}$ with X=f in assignment table 300 by one, reflecting the fact that an additional subscriber (or set-top terminal) in the service area has selected program channel X=f to view. Referring back to step 508, if processor 204 determines that the value of $N_{PCHX}$ with X=f does not equal 0, i.e., at least one set top terminal currently receiving program channel X material carried by a previously assigned carrier, the routine proceeds to step 514. Processor 204 at step 514 looks up, in assignment table 300, the identity of the carrier previously assigned for program channel X=f. The routine then proceeds to step 518 described before.

After the first routine is completed, a second routine is invoked to perform a garbage collection function for retiring any carrier carrying program material which is no longer selected by any set-top terminal in the service area. Instructed by this second routine, processor 204 at step 604 determines whether $PCH_{OLD}$ field 406 in the received request has a nonzero value g, 1≤g≤K. If not, i.e., the $PCH_{OLD}$ field value equal to "0" indicating that the subscriber's cable TV has just been turned on, the second routine comes to an end. Otherwise, processor 204 at step 606 looks up, in assignment table 300, the value of $N_{PCHX}$ with X=g in this case. At step 608, processor 204 decrements the $N_{PCHX}$ value just looked up by one, reflecting the fact that one fewer subscriber (or set-top terminal) in the service area selected program channel X=g to view. Processor 204 at step 610 determines whether the resulting $N_{PCHX}$ value equals 0. If not, the second routine comes to an end. Otherwise, if $N_{PCHX}$=0 i.e., program channel X=g no longer selected by any subscriber (or set-top terminal) in the service area, the second routine proceeds to step 612. Processor 204 at step 612 searches assignment table 300 for the identity of the carrier assigned for program channel X=g. Processor 204 at step 614 communicates to switching unit 104, causing unit 104 to stop switching the program data stream corresponding to program channel X=g to modulator bank 106, thereby terminating the transmission of the program data stream otherwise carried by the identified carrier. Processor 204 at step 616 places the identified carrier in reserve by substituting the carrier identity entry with "Null" in assignment table 300.

Improved Switched Broadcast (ISB) Technique in Accordance with the Invention

The invention improves the switched broadcast technique, described above, by not subjecting each program channel to switched broadcast indiscriminately. For example, in accordance with the inventive ISB technique, a "popular" program channel commanding generally strong viewership in a service area may be assigned a carrier on a long term basis, not subject to reassignment according to the switched broadcast technique as soon as no set-top terminals in the same service area are tuned to such a program channel. The invention, in part, is based upon a recognition that even though a program channel is popular, there may be brief moments in which all set-top terminals in the same service area are tuned away from such a program channel. Thus, the invention improves the switched broadcast technique by assigning a carrier to a popular program channel for a period despite intermittent viewership, thereby advantageously saving the system resources otherwise needed to frequently assigning and reassigning a carrier therefor during such a period.

The invention is also based upon a recognition that popularity of a program channel may change by day or even time of day. Thus, in accordance with an aspect of the invention, a popular program channel may be assigned a particular carrier until the program channel becomes "unpopular." At such time, the particular carrier may be assigned to another popular program channel, and the unpopular program channel is then subject to switched broadcast. Further, a carrier may be shared by complementary program channels, where one program channel is popular for times when the other program channel is unpopular, and vice versa. For example, a cartoon channel, sports channel, talk show channel and movie channel may be complementary in that a cartoon channel is popular on weekend mornings, sports channel on weekend afternoons, talk show channel on weekday daytimes and movie channel on both weekday and weekend night times. Thus, in accordance with the invention, a carrier may be cycled through such complementary program channels such that the carrier is assigned to the cartoon channel for weekend mornings, to the sports channel for weekend afternoons, to the talk show channel for weekday daytimes and to a movie channel each night. While one of the complementary program channels is assigned the carrier, the other program channels are subject to switched broadcast.

Figures 8, 9:
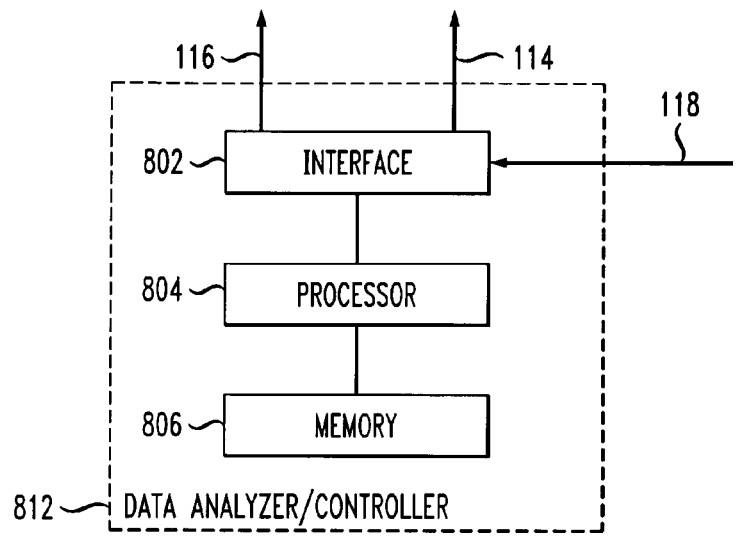
FIG. 8 is a block diagram of a data analyzer/controller used in the system of FIG. 1, in accordance with an inventive, improved switched broadcast technique.
FIG. 9 tabulates certain data collected from requests processed by the data analyzer/controller.

In an illustrative embodiment, the determination of popularity of a program channel is conducted by data analyzer/controller (DA/C) 812 in FIG. 8, which replaces controller 112 in system 10. Similar to controller 112, DA/C 812 includes interface 802, processor 804 and memory 806. However, DA/C 812 in this instance not only performs all of the functions of controller 112 described above, but also collects and analyzes data to determine popular program channels and periods in which they are popular, and assigns carriers to the popular program channels on a permanent basis for such periods. To that end, processor 804 in DA/C 812 collects additional data from requests of FIG. 5, concerning selection and deselection program channels which are subject to switched broadcast. As described before, such requests originate from the set-top terminals to which DA/C 812 corresponds.

FIG. 9 illustrates the collected data in memory 806 in table form, denoted 900. Column 902 of table 900 enumerates the time stamps in field 407 of the requests received by DA/C 812. Column 904 enumerates the corresponding program channels X selected or deselected in the requests, as indicated in field 404 thereof. Column 905 enumerates the corresponding SGIDs in field 408, indicating the service areas from which the requests come. Like column 306 described before, column 906 tracks, each time after a request concerning program channel X is processed, the number of set-top terminals ($N_{PCHX}$) in the service area which are turned to channel X.

Based on the collected data, processor 804 may generate various statistics concerning different program channels and their viewership for different time frames, e.g., different times of day, days of week, seasons of year, etc., to determine popularity of the program channels and useful trends on a temporal basis. In addition, processor 804 may generate various statistics concerning different program channels and their viewership for different service areas which may comprise a geographic region, e.g., the South, Midwest, Northeast, West Coast, etc. to determine popularity of the program channels and useful trends on a regional basis. Without loss of generality, FIG. 10 illustrates a table (denoted 1000) containing viewing statistics concerning a given weekday for a given service area, which are extracted from the collected data, e.g., table 900, at specified time intervals, e.g., 10 minutes. As shown in table 1000, each column is associated with a different program channel. For example, column 1003 is associated with program channel 50, which in this instance represents a talk show channel. Column 1005 is associated with program channel 51, which in this instance represents a movie channel. Column 1007 is associated with program channel 52, which in this instance represents a cartoon channel. Column 1009 is associated with program channel 53, which in this instance represents a sports channel. Column 1011 is associated with program channel 54, which in this instance represents a music video channel. Each entry in a column represents the number of set-top terminals tuned to the program channel associated with the column at a specified time. For example, entry 1021 in column 1011 indicates that 63 set-top terminals in the given service area are tuned to program channel 54 at 6:00 am on the given weekday. In this instance, the statistics captured in table 1000 are based on a time granularity of 10 minutes. As a result, the next entry, i.e., entry 1023, in column 1011 corresponds to 6:10 am at which 50 set-top terminals in the given service area are tuned to program channel 54. Column 1011 in this instance also shows that at 6:20 am, 51 set-top terminals in the given service area are tuned to program channel 54; at 6:30 am, 66 set-top terminals in the given service area are tuned to the same program channel; . . . and so on and so forth. The viewership of a program channel may be considered to be strong when the number of set-top terminals in a service area tuned to the program channel exceeds a predetermined threshold, e.g., 10 in this instance. The actual value of the threshold may vary with the total number of set-top terminals in a service area. In this instance the viewership of program channel 54, a music video channel, is strong throughout the day, with the exception of a few brief intervals (e.g., interval 1033), perhaps because the music videos played during those intervals are unentertaining.

In this example, because of the generally strong viewership of program channel 54, processor 804 determines that program channel 54 is a popular program channel at least for the given weekday. Processor 804 further analyzes and cross-references other daily statistics to obtain a pattern of viewership of program channel 54. If, for example, processor 804 determines that program channel 54 is popular each day, processor 804 may assign a carrier, on a permanent basis, to deliver programming content of program channel 54 to the given service area, in accordance with the invention. Similarly, if processor 804 determines that program channel 54 is only popular on a particular weekday each week, processor 804 may assign a carrier, on a weekly basis, to deliver its programming content to the given service area on that particular weekday, and for the other days of the week, program channel 54 is subject is switched broadcast.

Based on the viewing statistics in table 1000, processor 804 also determines viewing habits of the subscribers in the given service area. For example, based on the statistics in column 1003, processor 804 determines that the viewership of program channel 50, a talk show channel, is relatively strong in the daytime (e.g., 6:00 am through 6:30 pm) but relatively weak in the nighttime (e.g., 6:30 pm through 2:00 am). On the other hand, based on the statistics in column 1005, processor 804 determines that the viewership of program channel 51, a movie channel, is relatively weak in the daytime but relatively strong in the nighttime. As a result, program channel 50 and program channel 51 seem to be complementary, where channel 50 is popular while channel 51 becomes unpopular, and vice versa, at least for the given weekday. Processor 804 further analyzes and cross-references other daily statistics to obtain a viewership pattern for both program channels 50 and 51. If, for example, processor 804 determines that program channel 50 is popular during the daytime of each weekday, and program channel 51 is popular during the nighttime of each weekday, processor 804 may assign a specific carrier to alternately deliver channel 50 daytime programming content and channel 51 nighttime programming content to the given service area each weekday, according to the viewing habit of the subscribers in that service area. That is, program channel 50 (51) in this instance is assigned the specific carrier during the daytime (nighttime) of each weekday and is subject to switched broadcast for the rest of the time.

Other subscriber viewing habits may be uncovered by processor 804 analyzing weekday viewing statistics, e.g., table 1000, and weekend viewing statistics (not shown) aggregately. For example, processor 804 in this instance determines that although program channel 52, a cartoon channel, and program channel 53, a sports channel, are generally unpopular on weekdays, they are popular in certain periods on weekends. Specifically, the viewership of program channel 52 is particularly strong on weekend mornings while the viewership of program channel 53 is particularly strong on weekend afternoons. As such, processor 804 in this instance assigns a specific carrier to deliver channel 52 (53) programming content to the given service area during weekend mornings (afternoons), and for the rest of the time, channel 52 (53) is subject to switched broadcast. In addition, processor 804 in this instance determines that movie channel 51 is popular during weekend nights as well. As such, the same carrier may be assigned to deliver channel 51 programming content to the given service area during weekend nights. Indeed, in this instance the same carrier may be cycled through program channels 50, 51, 52 and 53 each week, which are complementary.

It should be noted that viewing statistics may be captured on a daily basis, e.g., table 1000. They may otherwise be captured on a larger or smaller scale to identify subscriber viewing habits in a time frame of particular interest. For example, by capturing viewing statistics on a monthly basis, processor 804 may identify any monthly or seasonal viewing habits with respect to a particular program channel. If, for example, based on the monthly statistics processor 804 determines that program channel 54 is generally popular for only one of the four seasons, say summer. Accordingly, processor 804 may assign a specific carrier to deliver channel 54 programming content to the given service area for summers only, and for other seasons, channel 54 is subject to switched broadcast.

In another embodiment, based on the viewing statistics such as those captured in table 1000, processor 804 also determines what programs, program lineups or even program channels are unpopular and not well received by the audience. For example, by correlating the start and end times of interval 1033 with a broadcast program schedule, processor 804 may identify those unentertaining music videos played during interval 1033. Processor 804 may further analyze and cross-reference other viewing statistics to determine any viewership pattern regarding such music videos in terms of time and geographic region. For example, (I) by cross-referencing other daily statistics associated with, the service area, processor 804 may determine that the music videos in question are unpopular all the time or only during certain time of day, day of week, etc. in the service area; (II) by cross referencing other daily statistics associated with other service areas, processor 804 may determine that the music videos in question may also be unpopular, at certain times or all the time, in other service areas comprising a region, e.g., the South, Midwest, Northeast, West Coast, etc. or the whole country. Thus, by similarly performing (I) and/or (II) on viewing statistics to determine popularity or unpopularity of a program, program lineup or even a program channel, processor 804 may furnish service providers, advertisement sales and research groups with valuable demographics concerning such a program, program lineup or program channel. Of course, (I) and (II) may be similarly performed to identify popular programs, program lineups or program channels, which are subject to renewal due to strong viewership. The same-applies to commercials and elements of TV shows, e.g., skits, monologues, chapters, etc., made part of TV shows. For example, by adjusting the time granularity of viewing statistics from 10 minutes as in table 1000 to, say, 30 seconds (the length of a typical commercial) or less, processor 804 may determine based on the viewing statistics the popularity or unpopularity of a given commercial in terms of time and/or geographic regions. Such data by processor 804 is conducive to providing demographically targeted commercials.

The foregoing merely illustrates the principles of the invention. It will thus be appreciated that those skilled in the art will be able to devise numerous other arrangements which embody the principles of the invention and are thus within its spirit and scope.

For example, in the disclosed embodiment, modulator bank 106, combiner 108, optical transceiver 110 and demodulator 130 are illustratively co-located in headend 100. However, one or more of these components may be located outside headend 100.

In addition, system 10 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors such as digital signal processors (DSPs). Thus, for example, switching unit 104 and modulator bank 106 in system 10 may be realized by one or more DSPs. A DSP typically comprises a combination of digital logic devices and other components, which may be a state machine or implemented with a dedicated microprocessor or micro-controller running a software program or having functions programmed in firmware.

What is claimed is:

1. Apparatus configured to controllably deliver programming content associated with a program source in response to requests from a plurality of terminals in a service area, the apparatus comprising:

an interface configured to receive the requests;
a memory configured to store a first set of statistics generated based on data obtained from requests received during a first time interval, and a second set of statistics based on data obtained from requests received during a second time interval, the second time interval corresponding to a typical advertisement length; and
a processing element configured to:
  identify, based on the first set of statistics, a plurality of future time periods in which the program source will attain a first popularity, a selected carrier assigned to deliver the programming content associated with the program source to the service area during the identified future periods, the carrier not reassigned when there is a lack of user requests for the programming content existing during the identified future periods, and during periods other than the identified future periods, the programming content associated with the program source delivered to the service area according to switched digital broadcast mechanisms; and
  identify, based on the second set of statistics, a second popularity of a particular advertisement based on a plurality of service group identifiers in the stored data;
wherein the selected carrier is assigned to deliver the programming content based at least in part on the first set of statistics; and
wherein the first and the second popularity are based at least in part on a determination that a number of terminals that receive the programming content in the identified future time periods exceeds a threshold.

2. The apparatus of claim 1, wherein the program source includes a program channel.

3. The apparatus of claim 1, wherein the threshold varies with a total number of terminals in the service area.

4. The apparatus of claim 1, wherein at least one of the requests includes a request to provide programming content associated with the program source.

5. The apparatus of claim 1, wherein at least one of the requests includes a request to provide programming content associated with a second program source.

6. The apparatus of claim 1, wherein at least one of the requests includes a request to stop delivery of programming content.

7. A method for controllably delivering programming content associated with a program source in response to requests from a plurality of terminals in a service area, the method comprising:

storing a first set of statistics based on data obtained from requests received during a first time interval;
storing a second set of statistics based on data obtained from requests received during a second time interval, the second time interval corresponding to a typical advertisement length;
identifying, based at least in part on the first set of statistics, a plurality of future time periods in which the program source will attain a first popularity by determining that a number of terminals that receive the programming content in the identified future time periods exceeds a threshold;
assigning a selected carrier to deliver the programming content associated with the program source to the service area during the identified future periods based at least in part on the first set of statistics, the carrier not being reassigned when there is a lack of user requests for the programming content existing during the identified future periods;
during periods other than the identified future periods, causing the programming content associated with the program source to be delivered to the service area according to switched digital broadcast mechanisms; and
identifying, based at least in part on the second set of statistics, a second popularity of a particular advertisement based on a plurality of service group identifiers in the stored data.

8. The method of claim 7, wherein the program source comprises a particular one of a plurality of program channels.

9. The method of claim 7, wherein the threshold varies based at least in part on a total number of terminals in the service area.

10. The method of claim 7, wherein at least one of the requests received during the first or the second time intervals comprises a request to provide programming content associated with the program source.

11. The method of claim 7, wherein at least one of the requests received during the first or the second time intervals comprises a request to provide programming content associated with a second program source.

12. The method of claim 7, wherein at least one of the requests received during the first or the second time intervals comprises a request to stop delivery of programming content.

13. A non-transitory computer readable apparatus comprising a plurality of instructions which are configured to, when executed by a processor controllably deliver programming content associated with a program source in response to requests from a plurality of terminals in a service area via:

generation of a first set of statistics based on data obtained from requests received during a first time interval;
generation of a second set of statistics based on data obtained from requests received during a second time interval, the second time interval corresponding to a typical advertisement length;
identification, based at least in part on the first set of statistics, of a plurality of future time periods in which the program source will attain a first popularity, the identification being accomplished via a determination that a number of terminals that receive the programming content in the identified future time periods exceeds a threshold;
assignment of a selected carrier to deliver the programming content associated with the program source to the service area during the identified future periods based at least in part on the first set of statistics, the carrier not being reassigned when there is a lack of user requests for the programming content existing during the identified future periods; and
identification, based at least in part on the second set of statistics, of a second popularity of a particular advertisement based on a plurality of service group identifiers in the stored data;
wherein, during periods other than the identified future periods, the programming content associated with the program source is delivered to the service area according to switched digital broadcast mechanisms.

14. The apparatus of claim 13, wherein the program source comprises a particular one of a plurality of program channels.

15. The apparatus of claim 13, wherein the threshold varies based at least in part on a total number of terminals in the service area.

16. The apparatus of claim 13, wherein at least one of the requests received during the first or the second time intervals comprises a request to provide programming content associated with the program source.

17. The apparatus of claim 13, wherein at least one of the requests received during the first or the second time intervals comprises a request to provide programming content associated with a second program source.

18. The apparatus of claim 13, wherein at least one of the requests received during the first or the second time intervals comprises a request to stop delivery of programming content.

* * * * *